(12) United States Patent
Christensen

(10) Patent No.: US 11,359,762 B2
(45) Date of Patent: Jun. 14, 2022

(54) V-POLE HOLDER FOR LIGHT MODIFIERS

(71) Applicant: Bo Christensen, Nordberg (DK)

(72) Inventor: Bo Christensen, Nordberg (DK)

(73) Assignee: Savage Universal Corp ( * ) Notice: Subject to any disclaimer, the term of this patent is extended or adjusted under 35 U.S.C. 154(b) by 288 days.

(21) Appl. No.: 16/873,241

(22) Filed: Mar. 3, 2020

(65) Prior Publication Data
US 2021/0278032 A1 Sep. 9, 2021

(51) Int. Cl.
F16M 13/00 (2006.01)
G06F 1/16 (2006.01)
G03B 15/06 (2021.01)

(52) U.S. Cl.
CPC .............. F16M 13/00 (2013.01); G03B 15/06 (2013.01); G06F 1/162 (2013.01); G06F 1/1637 (2013.01)

(58) Field of Classification Search
CPC ........ G03B 15/06; G03B 15/02; F16B 5/0692
USPC .................................................. 362/278, 320
See application file for complete search history.

(56) References Cited

U.S. PATENT DOCUMENTS

| | | | | | |
|---|---|---|---|---|---|
| 3,540,729 A | * | 11/1970 | Rahberger | ................. | F41J 1/10 248/156 |
| 3,851,164 A | * | 11/1974 | Intrator | ................. | G03B 15/06 362/17 |
| 3,867,019 A | * | 2/1975 | Eyerman | ................. | G03B 15/06 343/915 |
| 3,967,301 A | * | 6/1976 | Corning | ................. | G03B 15/02 396/3 |
| 4,523,256 A | * | 6/1985 | Small | ..................... | G03B 15/02 362/11 |
| 4,524,405 A | * | 6/1985 | Heard | ..................... | G03B 15/06 362/450 |
| 5,580,062 A | * | 12/1996 | Dehlinger | .................. | F41J 1/10 273/390 |
| 7,236,695 B1 | * | 6/2007 | Demos | .................... | G03B 15/06 16/241 |
| 7,338,048 B1 | * | 3/2008 | Hulstine | .................... | F41J 1/10 211/196 |
| 8,192,038 B2 | * | 6/2012 | Lin | ......................... | G03B 15/06 362/17 |
| 8,875,457 B2 | * | 11/2014 | Geller | .................... | G03B 15/06 362/357 |
| 2013/0175414 A1 | * | 7/2013 | Nelson | .................... | F16M 11/00 248/158 |

* cited by examiner

Primary Examiner — Bradley Duckworth
(74) Attorney, Agent, or Firm — Mark Ogram

(57) ABSTRACT

A holder for flexible materials which incorporate two arms connected by an elbow. Within the elbow is a tensioning mechanism which, when engaged, tends to press the arm apart. When the tension is released, the holder collapses into an easily stored mechanism. With the arms being variable in length, the range of material dimensions is greatly enhanced. A connector positioned at the elbow permits the holder to be secured to a base and arranged in gangs to address the particular need at the time.

7 Claims, 5 Drawing Sheets

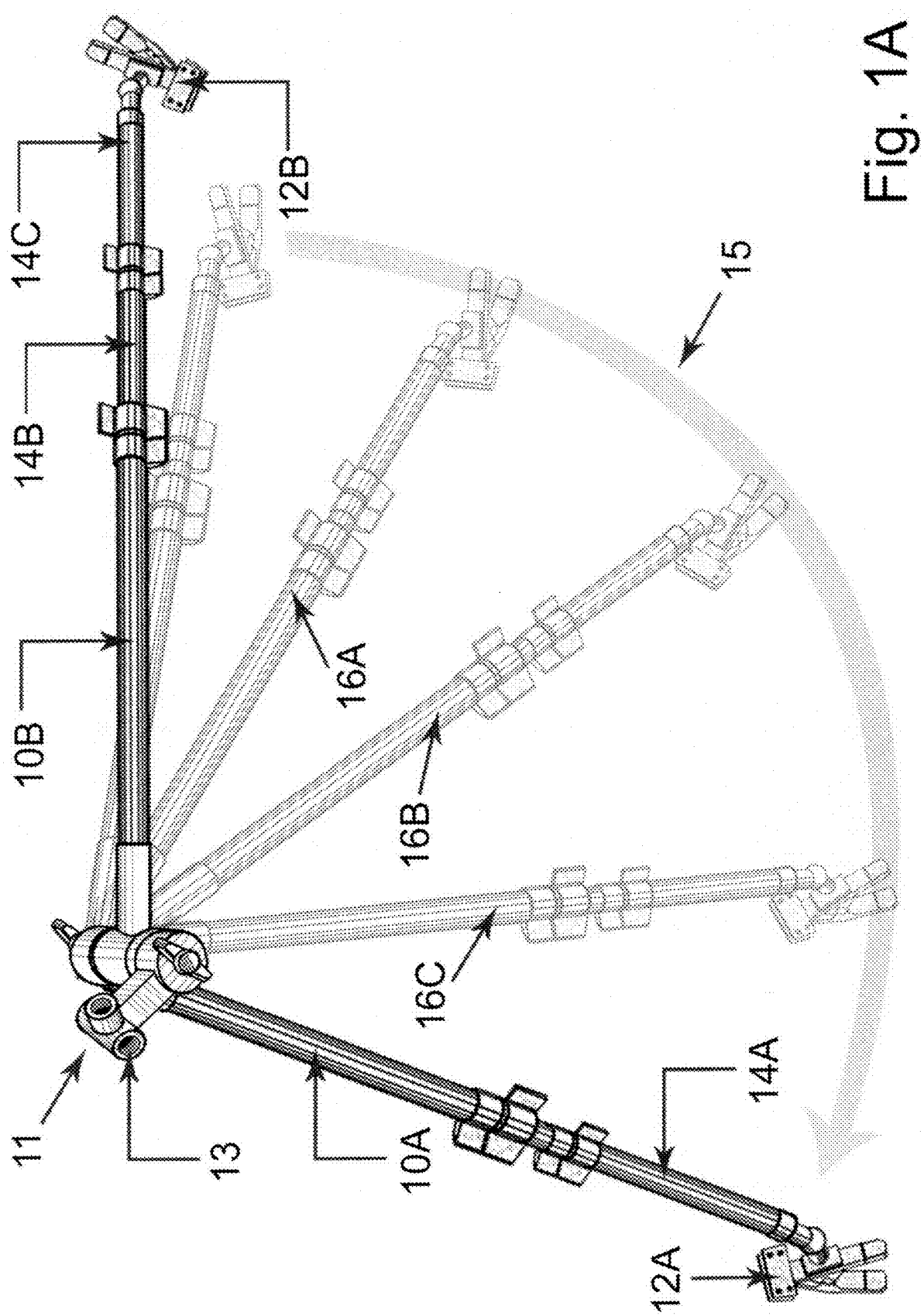

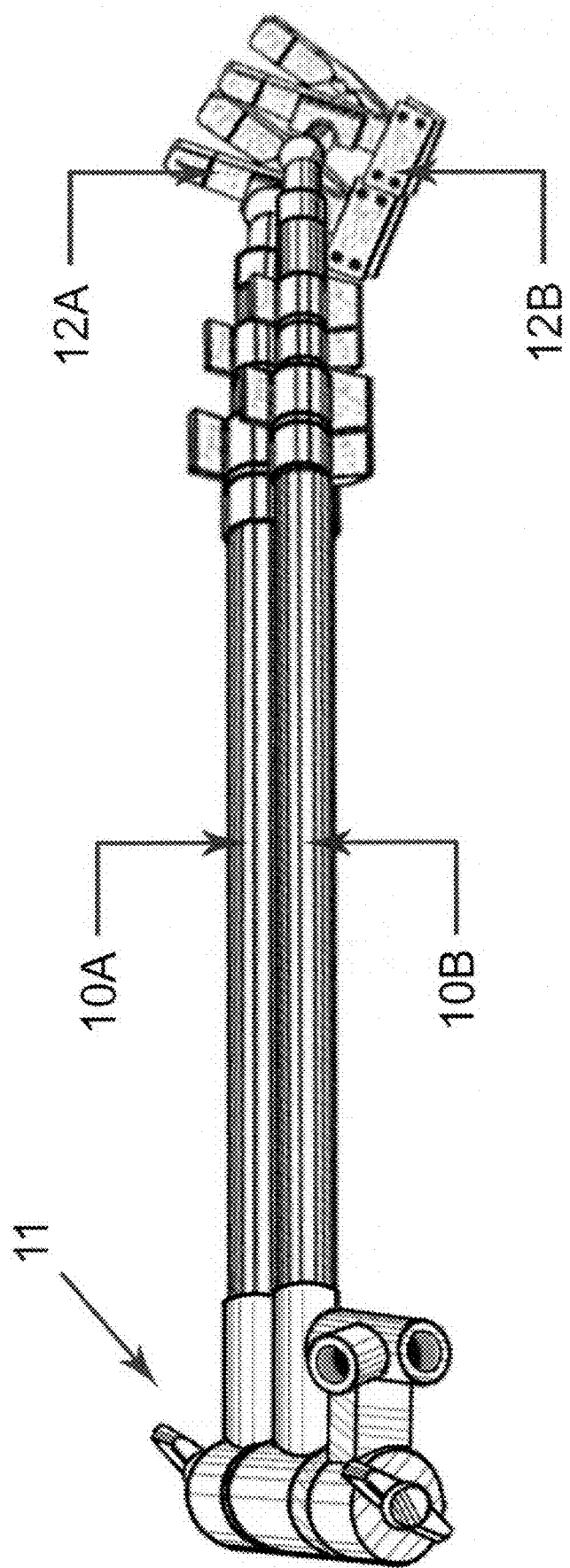

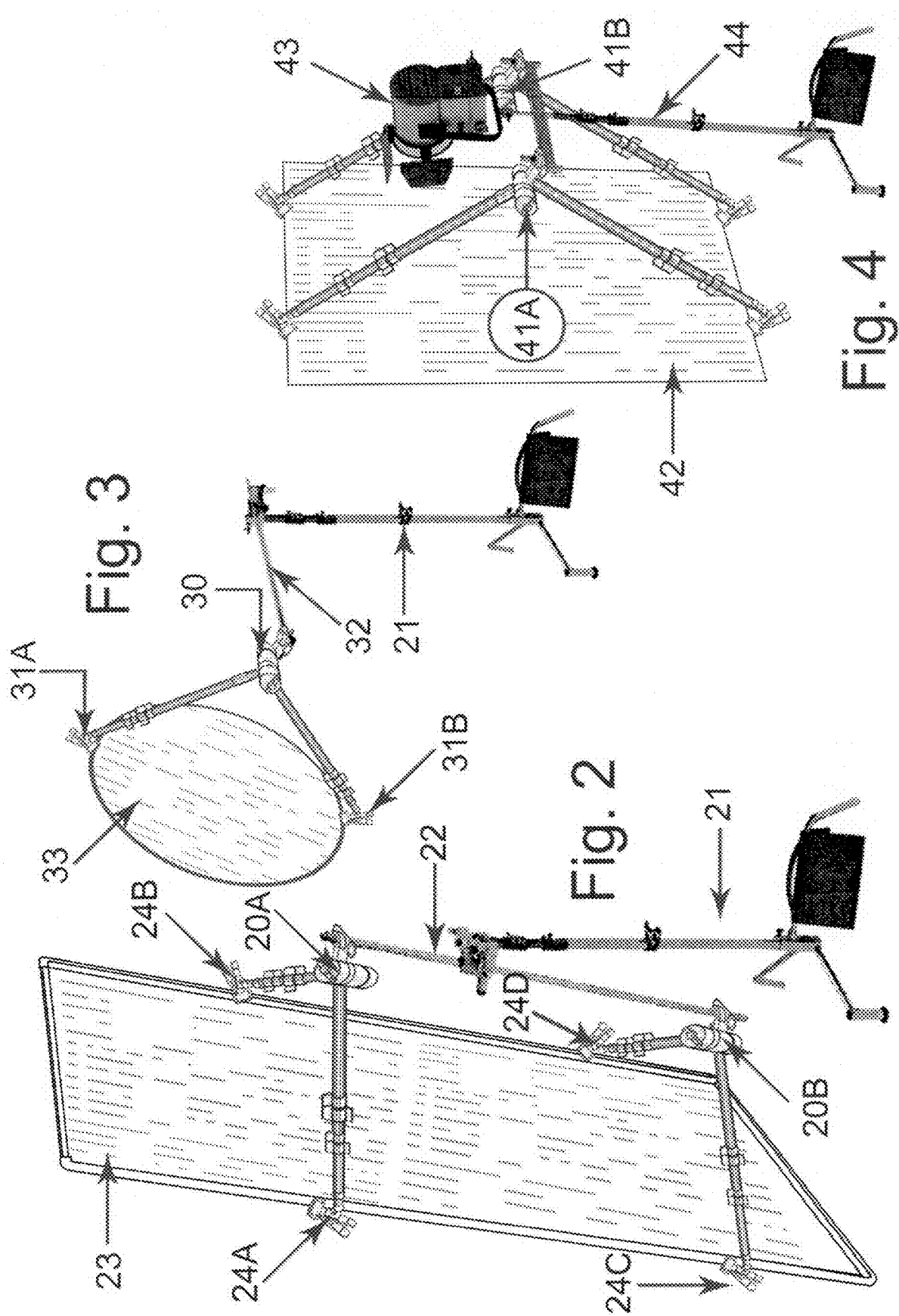

V-POLE HOLDER FOR LIGHT MODIFIERS

PRIORITY

Priority for this application is from U.S. Provisional patent application Ser. No. 62/919,679, filed on Mar. 22, 2019, and entitled "V-Pole Holder for Light Modifiers".

BACKGROUND OF THE INVENTION

While the discussion herein relates to photography equipment, the invention is not intended to be limited to this field but has applications in other fields and uses as those of ordinary skill art readily recognize.

Within the photographic industry, there is a need to provide a spreading or stretching mechanism for backdrops, screens and graphics. To do this, spreader arms are used which hold the periphery of the flat material or are rolled up/down over rollers.

Examples of such apparatus include: U.S. Pat. No. 10,223,942, issued Mar. 5, 2019, to Chu and entitled "Rollable Display Device"; U.S. Pat. No. 9,951,555, issued Apr. 24, 2018, to Klien Tuente et al. and entitled "Device for Mounting a Shaft of a Screen on a Surface"; U.S. Pat. No. 10,001,242, issued Jun. 19, 2018, to van Hooft et al. and entitled "Stand for a Portable Device with Graphic user Interface Display"; and, U.S. Pat. No. 9,457,731, issued Oct. 4, 2016, to Narayanan et al. and entitled "Integrated Device Holder Assembly and Methods of Use and Manufacture Thereof"; all of which are incorporated hereinto by reference.

All of these mechanisms though have significant limitations relating to the maximum length/width which can be handled, the vertical requirement for hanging the material, and positioning of the material (such as diffusion screens) in from of lights. Perhaps the biggest problem lies with the casting of shadows or obstructing the view from a camera.

Another major disadvantage is the actual grips tend to cause problems when the material used is removed from the holder.

It is clear there is a need for an improved holder mechanism.

SUMMARY OF THE INVENTION

The invention provides a holder for flexible materials. The holder of this invention incorporates two arms connected by an elbow. Within the elbow is a tensioning mechanism which, when engaged, tends to press the arm apart. When the tension is released, the holder collapses into an easily stored mechanism. With the arms being variable in length, the range of flexible material dimensions is greatly enhanced. A connector positioned at the elbow permits the holder to be secured to a base and arranged also in gangs to address the particular need at the time.

More particularly, the holder employs a first arm and a second arm connected to each other via an elbow. The elbow mechanism includes a tensioning mechanism adapted to encourage the first arm and the second arm to rotate into a larger angle. The tensioning mechanism includes a release mechanism wherein the tension is eliminated allowing the arms to fold onto each other for storage.

In the preferred embodiment, the arms are selectively elongated (or collapsed), thereby allowing the invention to address different dimensions of items to be held.

At the distal ends of the arms are grasping mechanisms adapted to secure the respective arms to a flat screen or apparatus.

In the preferred embodiment, the invention includes a floor stand which is securable to the hinge mechanism. In this manner, the invention permits the holding and positioning of the holder of this invention for light modifiers A double poled holder is ideal to hold paper materials like Translum or reflectors of all kind without casting any shadows.

The tensioning of the arms stretches the paper flat and also provides a stretch for fabrics.

In the preferred embodiment, clamps are used to secure the legs to the fabric/paper. The ideal clamp uses off-center rolling jaw pads that clamps tighter if paper or other objects are pulled out.

The invention is also used either horizontally or vertically.

The invention, together with various embodiments thereof will be more clearly shown by the accompanying drawings the following description thereof.

DRAWINGS IN BRIEF

FIG. 1A is a perspective of the preferred embodiment of the invention.

FIG. 1B shows the embodiment of FIG. 1A in a collapsed state.

FIG. 2 illustrates an embodiment of the invention in which two mechanisms illustrated in FIG. 1 are used to hold/position a screen.

FIG. 3 is an illustration of an embodiment showing the use of one mechanism to position a reflector.

FIG. 4 illustrates an embodiment of the invention which is used to provide diffused light.

DRAWINGS IN DETAIL

Figure 5:
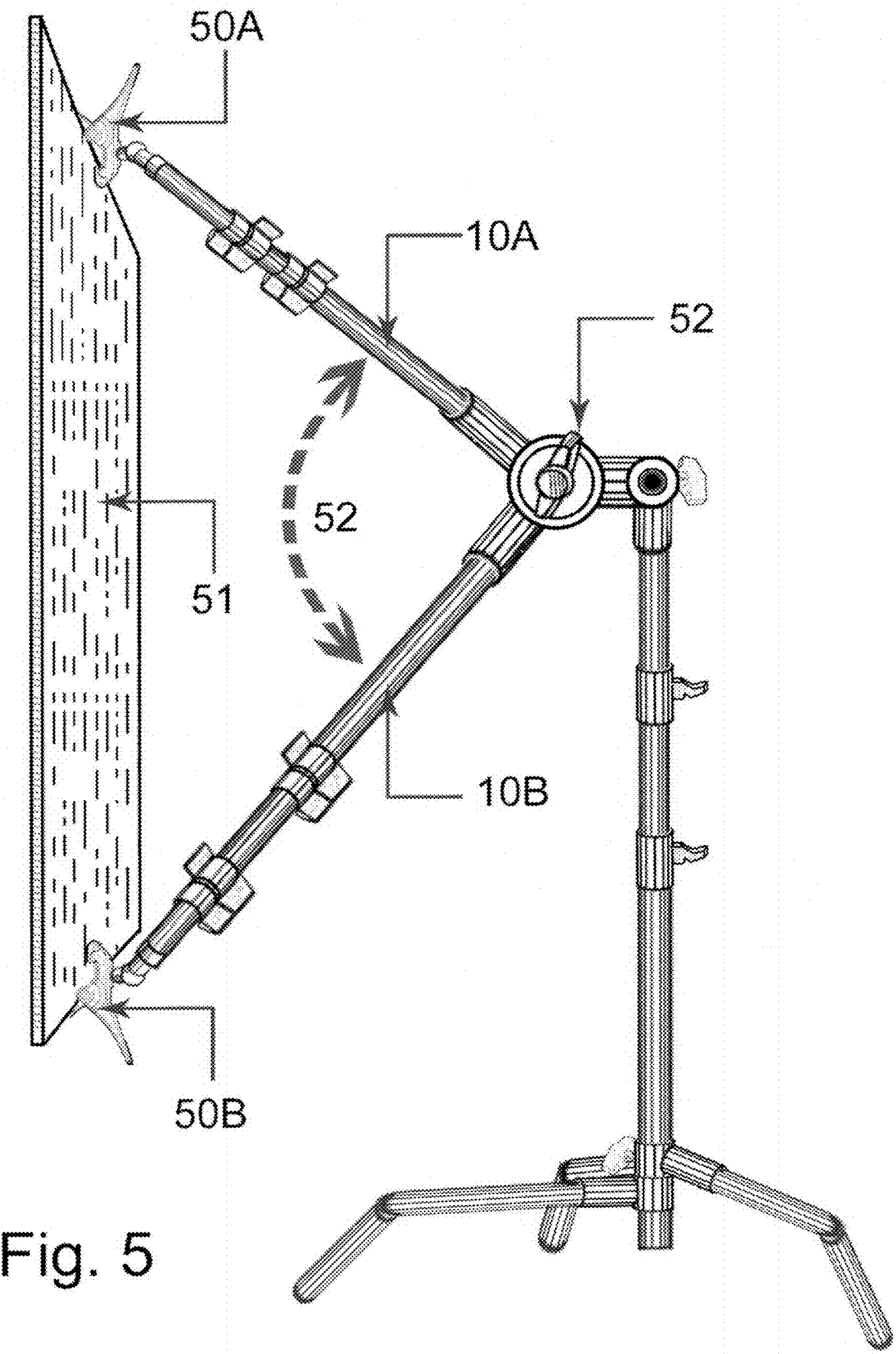
FIG. 5 illustrates an embodiment of the invention which does not utilize the tensioning function of the elbow.

FIG. 1A is a perspective of the preferred embodiment of the invention.

The holder (also referred to as a V-Pole holder) of the invention has two arms 10A and 10B connected by elbow 11. Elbow 11 includes a tensioning mechanism (not shown) which, when engaged, tends to press arms 10A and 10B away from each other.

Arm 10A is also extendable by extension unit 14A. Both arms 10A and 10B, are capable of being extended by either one extension unit 14A (shown as 14B for arm 10B) and a further extension unit 14C (as shown for arm 10B). In this way, each arm 10A and 10b are selectively lengthened to meet the demands of the application.

At the end of each arm is connector 12 and 12B which are configured to grasp an article as will be shown by the following figures.

The holder arms 10A and 10B can be extended in a straight line, or in any V-shaped configuration as shown by 16A, 16B, and 16C when moved as shown by arrow 15. For storage, the two arms are moved proximate to each other as shown in FIG. 1B.

FIG. 2 illustrates an embodiment of the invention in which two holder mechanisms first illustrated in FIG. 1, are used to hold/position a screen.

In this illustration, on base 21 holder 20A and 20B (as described in FIG. 1) are connected to rod 22 using ⅝ inch passthrough receivers. These receivers allow holder arms 20A and 20B, to be configured with any ⅝ inch rods to act as a handling bar 22.

Holder 20A is secured to screen 23 via clamps 24A and 24B. Holder 20B us secured to screen 23 via clamps 24C and 24D.

In this manner, screen 23 is securely positioned for the task at hand.

FIG. 3 is an illustration of an embodiment showing the use of one mechanism to position a reflector.

This embodiment uses a single holder arm 30 which is secured to diffuser 33 via clamps 31A and 31B. Holder arm 30 (as described in FIG. 1) is connected to arm 32 which is supported by base 21.

While this illustration uses a diffuser 33, the v-pole holder arm of this invention is also used to hold scrims or other framed defusers and it can be used to hold any sized or shaped reflectors.

FIG. 4 illustrates an embodiment of the invention which is used to provide diffused light.

In this illustration, light diffuser 42 is supported in front of light 43 using holder arm 41A and 41B. The entire assembly is supported by stand 44.

The v-pole holder of this invention is excellent in holding defusing materials in front of lights without casting shadows or obstructing the spread of the light. The arms are set so that they are in tension and thereby stretches the paper out flat.

This configuration is ideal for holding paper materials like Translum or reflectors of all kind.

FIG. 5 illustrates an embodiment of the invention which does not utilize the tensioning function of the elbow.

Arms 10A and 10B are mounted to each other via lockable elbow 52. Lockable elbow 52 allows the user to place arms 10a and 10B into a fixed relationship to provide a proper distance between clamps 50A and 50B. During application, clamp 50A is affixed to paper 51 (also applicable to light diffusers) and then arms 50A and 50B are slightly "torqued" (arrow 52) toward each other allowing clamp 50B to be affixed to paper 51. When released, arms 50A and 50B pull back to provide a tensioning to paper 51.

Figure 6:
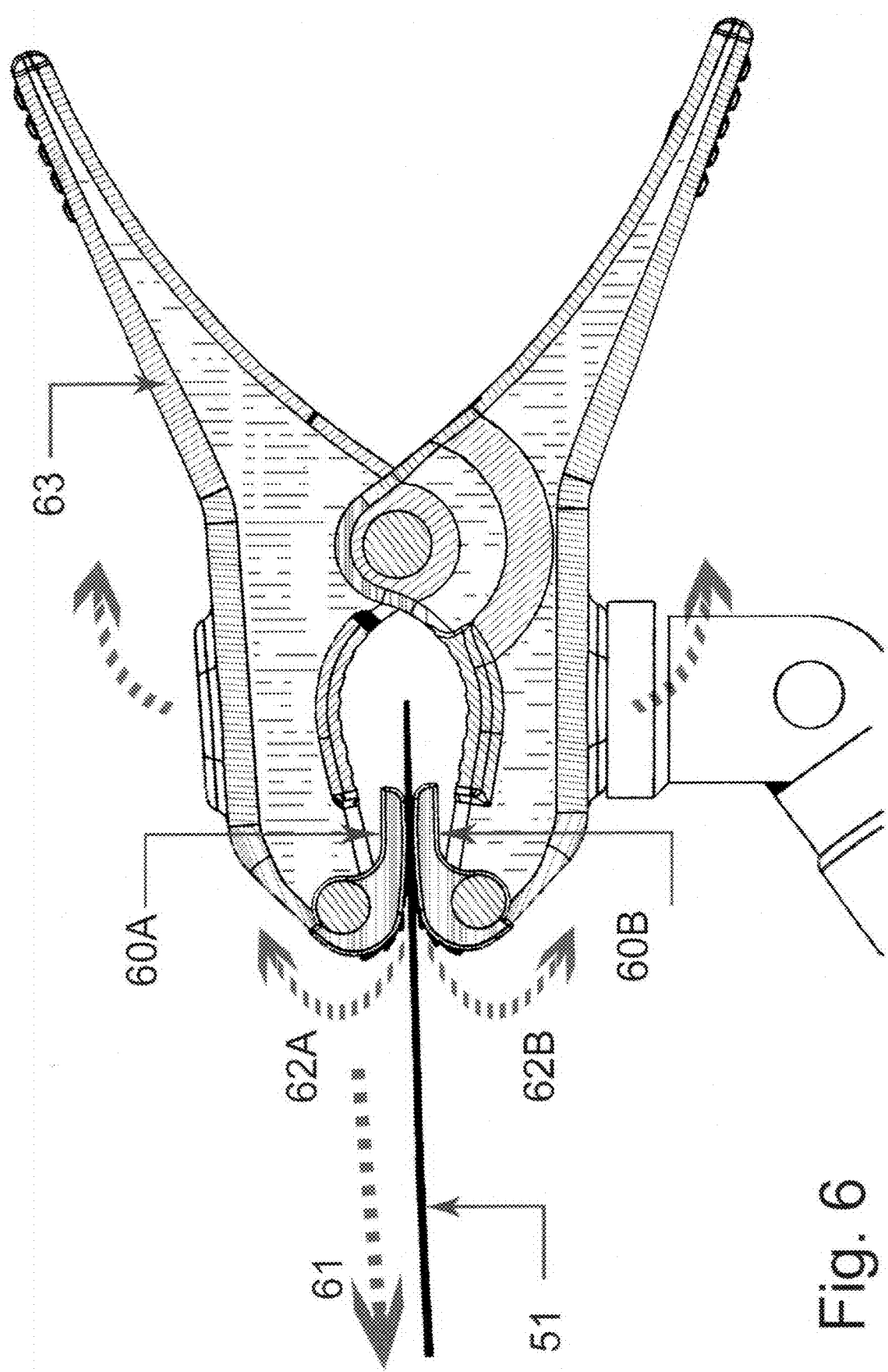
FIG. 6 illustrates an embodiment of the clamp of the invention.

FIG. 6 illustrates an embodiment of the clamp of the invention.

Clamp 63 bites down onto paper 51 by jaws 60A and 60B which are cam shaped so that as paper 51 is pulled as indicated by arrow 61, jaws 60A and 60B tighten (as shown by arrows 62A and 62B) onto paper 51, thereby preventing slippage.

It is clear that the present invention provides for a versatile and effective arm(s) for holding a wide variety of materials.

What is claimed is:

1. A holder for flexible materials comprising:
   a) a floor stand;
   b) a cross member secured to the floor stand substantially at a center point of the cross member; and,
   c) a first holder and second holder secured to the cross member substantially at opposing ends of the cross member, the first holder and the second holder each having,
      1) a first arm and a second arm; and,
      2) an elbow mechanism connected to a first end of the first arm and the first end of the second arm, said elbow mechanism adapted to encourage the first arm and the second arm to rotate into a larger angle.

2. The holder for flexible materials according to claim 1, wherein the first holder and the second holder each further includes a release mechanism adapted to relax the elbow mechanism to allow the first arm and the second arm to rotate around the elbow mechanism.

3. The holder for flexible materials according to claim 2, wherein the first arm and the second arm expand to selective lengths.

4. The holder for flexible materials according to claim 3, wherein distal ends of the first arm and the second arm include a grasping mechanism adapted to secure the respective arms to a flat apparatus.

5. A holder for flexible materials comprising:
   a) a floor stand having a vertical upright, an uppermost end of the vertical upright having a mounting mechanism for a light;
   b) alight secured to the mounting mechanism;
   c) a cross member secured to the vertical upright;
   d) a light diffuser; and
   e) a first holder and second holder secured to the cross member substantially at opposing ends of the cross member, the first holder and the second holder having,
      1) a first arm and a second arm; and,
      2) an elbow mechanism connected to a first end of the first arm and the first end of the second arm, said elbow mechanism adapted to encourage the first arm and the second arm to rotate into a larger angle, and,
      3) grasping mechanisms positioned at a distal end of each arm, said grasping mechanisms secured to the light diffuser.

6. The holder for flexible materials according to claim 5, wherein the first holder and the second holder each further includes a release mechanism adapted to allow the first arm and the second arm to rotate around the elbow mechanism.

7. The holder for flexible materials according to claim 6, wherein the first arm and the second arm expand to varying lengths.

* * * * *